J. ETNOYER & W. A. HOLLINGSWORTH.
STRAINER.
APPLICATION FILED JULY 6, 1914.
1,174,402.
Patented Mar. 7, 1916.
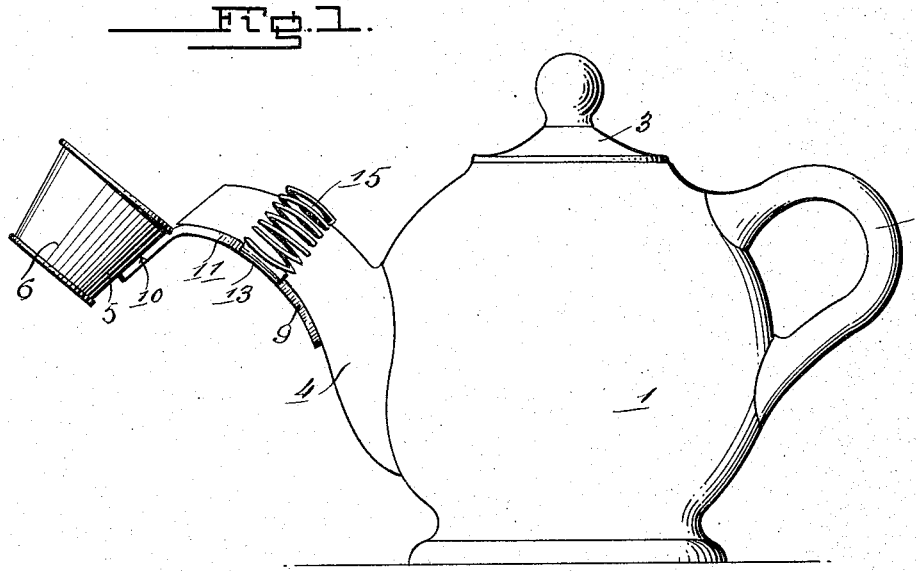
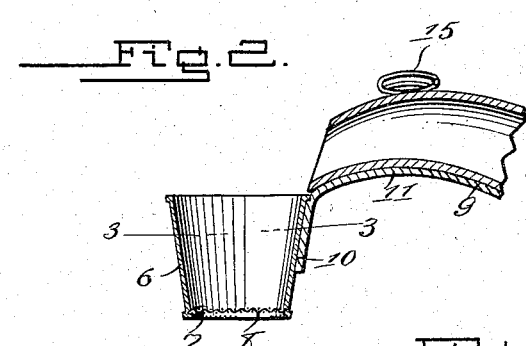
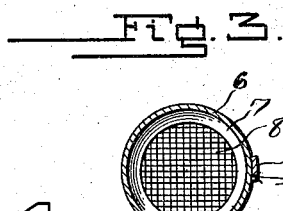
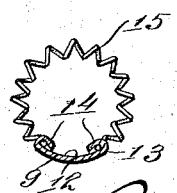
Witnesses
S. P. Marston
Wm. H. Downing.
Jacob Etnoyer,
William A. Hollingsworth,
Inventors
By Richard Barren
their Attorney

UNITED STATES PATENT OFFICE.

JACOB ETNOYER AND WILLIAM A. HOLLINGSWORTH, OF DENVER, COLORADO.

STRAINER.

1,174,402.   Specification of Letters Patent.   Patented Mar. 7, 1916.

Application filed July 6, 1914. Serial No. 849,342.

*To all whom it may concern:*

Be it known that we, JACOB ETNOYER and WILLIAM A. HOLLINGSWORTH, citizens of the United States, residing at Denver, in the county of Denver and State of Colorado, have invented certain new and useful Improvements in Strainers, of which the following is a specification.

Our invention relates to strainers and more particularly to that type of strainer associated with the spout of a tea or coffee pot.

The primary object of our invention is to provide an improved strainer having means associated therewith for facilitating the attachment of the strainer to the spout of a vessel.

Another object of our invention is to provide a strainer having a handle extending therefrom conforming substantially to the contour of the spout of a vessel, the handle having means formed thereon for engagement with an elastic retaining means, the latter being adaptable for attachment to various size spouts.

A further object of our invention is to provide a strainer of the character described that is simple in construction, efficient in operation and one that can be manufactured and placed upon the market at a minimum cost.

Other objects as well as the nature, characteristic features and scope of our invention will be more readily understood from the following description taken in connection with the accompanying drawings and pointed out in the claim.

In the drawings: Figure 1 is a side elevational view of a teapot showing our invention applied to the spout thereof. Fig. 2 is a longitudinal sectional view of our invention applied to a portion of the spout of a vessel. Fig. 3 is a transverse sectional view taken on line 3—3 of Fig. 2. Fig. 4 is an end longitudinal view of the securing means, showing the handle in section.

Referring more particularly to the drawings in which similar reference numerals designate like or corresponding parts throughout the different views, for the purpose of clearly illustrating our invention, we provide a teapot 1 having a handle 2 and a cover 3 and further provided with a spout 4 in this instance being curved, the spout having detachably secured thereto our improved strainer generally designated 5.

The strainer 5, in this instance consists essentially of a tapering wall 6, the lower marginal edge of which is bent to form an annular groove 7, in which is an elongated suitable straining element 8.

For the purpose of detachably securing the strainer 5 to the spout 4 we have provided a handle 9, the latter being formed preferably from an elongated strip of sheet metal which has one end thereof bent downwardly and soldered or otherwise rigidly secured to a portion of the upper outer surface of the wall 6 of the strainer as at 10. The main portion of the handle projects laterally from the wall of the strainer adjacent the upper end thereof and is adapted to be arranged in intimate contact with a portion of the spout 4 of the vessel, in this instance being longitudinally curved as at 11 and transversely curved as at 12. The handle has projecting from its opposite sides at points substantially intermediate its ends extensions 13 which are bent and arranged upon the upper surface of the handle to form inwardly extending flanges 14, in which are connected the respective ends of an elastic element 15. The elastic element in this instance consists essentially of an oval shaped coil spring for engagement with the spout 4 of the vessel. For the purpose of effecting an efficient connection between the flanges 14 and the coil spring 15 it is desirable that the flanges be of a length slightly shorter than the ovals of the spring, as this allows an easy and quick engagement of the outer coils beneath the flanges before the same are pressed downward.

It will be noticed in Fig. 2 of the drawings that the inner tapering wall 6, of the strainer 5, forms a substantial continuation of the spout 4 and allows the contents to be freely dispensed without any danger of spilling. The wall 6 is at all times held in this position by the handle which extends therefrom and which handle is held in engagement with the spout through the medium of the coil spring. It will be readily apparent that by the provision of this arrangement all unnecessary movement is prevented.

Although we have shown and described the preferred embodiment of our invention it will be obvious to those skilled in the art, that in the event that the spout of the vessel is straight it would not be necessary to curve the handle longitudinally. Again, we desire that great stress be laid upon the construction and arrangement of the handle having the securing means rigidly connected thereto, the latter because of its elasticity being adaptable for engagement with various size spouts and because of the tension of the spring the strainer when in position is at all times held in the proper position and prevented from movement.

It will be understood that the above description and accompanying drawings comprehend only the general and preferred embodiment of our invention, and that various minor changes in details of construction, proportion and arrangement of the parts may be made within the scope of the appended claim and without sacrificing any of the advantages of our invention.

Having thus fully described our invention what we claim as new and desire to secure by Letters Patent is:—

A strainer including a tapering wall, a handle on said strainer for conforming to the outer surface of a spout of a vessel, said handle being longitudinally and transversely curved, inwardly extending flanges formed upon said handle, and an oval shaped coil spring, the respective ends of said spring being connected in said flanges for detachably securing said strainer to the spout of a vessel.

In testimony whereof we affix our signatures in presence of two witnesses.

JACOB ETNOYER.
WILLIAM A. HOLLINGSWORTH.

Witnesses:
E. E. SARCHET,
JNO. G. POWELL.

Copies of this patent may be obtained for five cents each, by addressing the "Commissioner of Patents, Washington, D. C."